(12) United States Patent
Mauch et al.

(10) Patent No.: US 12,566,605 B2
(45) Date of Patent: Mar. 3, 2026

(54) TIME-OF-FLIGHT SYSTEM AND METHOD

(71) Applicant: Sony Group Corporation, Tokyo (JP)

(72) Inventors: Lukas Mauch, Stuttgart (DE); Bac Nguyen Cong, Stuttgart (DE); Fabien Cardinaux, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 203 days.

(21) Appl. No.: 18/105,247

(22) Filed: Feb. 3, 2023

(65) Prior Publication Data

US 2023/0251858 A1     Aug. 10, 2023

(30) Foreign Application Priority Data

Feb. 10, 2022     (EP) ..................................... 22156162

(51) Int. Cl.
| | |
|---|---|
| *G06F 8/70* | (2018.01) |
| *G06F 8/74* | (2018.01) |
| *G06F 40/12* | (2020.01) |

(52) U.S. Cl.
CPC .............. *G06F 8/74* (2013.01); *G06F 40/12* (2020.01)

(58) Field of Classification Search
CPC .................................. G06F 8/74; G06F 40/12
See application file for complete search history.

(56) References Cited

U.S. PATENT DOCUMENTS

| | | | |
|---|---|---|---|
| 11,593,622 B1* | 2/2023 | Gandhi | G06N 3/0464 |
| 2019/0050392 A1* | 2/2019 | Clements | G06F 3/04886 |
| 2022/0351718 A1* | 11/2022 | Wu | G10L 15/22 |
| 2023/0050247 A1* | 2/2023 | Kim | G06N 3/08 |
| 2023/0168883 A1* | 6/2023 | Sreedharan | G06N 20/20 |
| | | | 717/101 |

FOREIGN PATENT DOCUMENTS

| | | | | |
|---|---|---|---|---|
| CN | 111797242 | * | 6/2020 | |
| WO | WO-2021225691 A1 | * | 11/2021 | G06F 8/33 |

OTHER PUBLICATIONS

Devlin et al., "BERT: Pre-training of Deep Bidirectional Transformers for Language Understanding", arXiv:1810.04805v2 [cs.CL], May 24, 2019, 16 pages.
Narihira et al., "Neural Network Libraries: A Deep Learning Framework Designed from Engineers' Perspectives", arXiv:2102.06725v2 [cs.LG], Jun. 21, 2021, pp. 1-12.
Gprofiler, "Production Profiling Made Easy", Available Online At: https://gprofiler.io, Retrieved from net on: Jan. 20, 2022, pp. 1-6.
He et al., "Deep Residual Learning for Image Recognition", 2016 IEEE Conference on Computer Vision and Pattern Recognition (CVPR), IEEE Computer Society, doi: 10.1109/CVPR.2016.90., 2016, pp. 770-778.
Lo et al., "Transformer over Pre-trained Transformer for Neural Text Segmentation with Enhanced Topic Coherence", arXiv:2110.07160v1 [cs.CL], Oct. 14, 2021, 7 pages.

(Continued)

*Primary Examiner* — Hanh Thi-Minh Bui
(74) *Attorney, Agent, or Firm* — XSENSUS LLP

(57) ABSTRACT

A system comprising a latency predictor which is configured to translate the output of a transformer-encoder into a latency prediction for a code segment of a source code.

17 Claims, 8 Drawing Sheets

(56) References Cited

OTHER PUBLICATIONS

Akiba et al., "Optuna: A Next-Generation Hyperparameter Optimization Framework". In Proceedings of the 25rd ACM SIGKDD International Conference on Knowledge Discovery and Data Mining, arXiv:1907.10902v1 [cs.LG], Jul. 26, 2019, 10 pages.
Vaswani et al., "Attention is all you need." Advances in neural information processing systems, 31st Conference on Neural Information Processing Systems (NIPS 2017), 11 pages.

* cited by examiner $$\mathcal{C} = \{C_1, C_2, ..., C_3\}$$

(API calls)

51 — Segment source code into code segments

52 — Tokenize code segment to obtain tokens representing the code segment

53 — Execute Transformer-Encoder on the tokens representing the code segment

54 — Perform latency prediction based on Transformer-Encoder output to obtain a latency prediction for the code segment

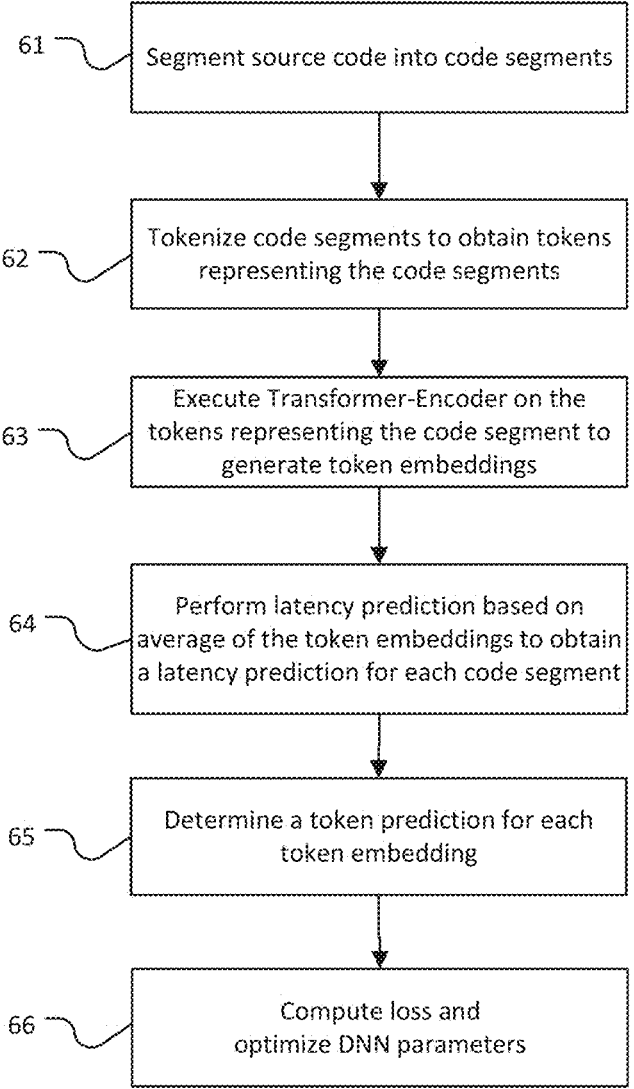

61 — Segment source code into code segments

62 — Tokenize code segments to obtain tokens representing the code segments

63 — Execute Transformer-Encoder on the tokens representing the code segment to generate token embeddings 64 — Perform latency prediction based on average of the token embeddings to obtain a latency prediction for each code segment 65 — Determine a token prediction for each token embedding 66 — Compute loss and optimize DNN parameters

TIME-OF-FLIGHT SYSTEM AND METHOD

CROSS-REFERENCE TO RELATED APPLICATION

This patent application claims priority to European Patent Application No. 22156162.4, filed on Feb. 10, 2022, the entire disclosure of which is incorporated herein by reference.

TECHNICAL FIELD

The present disclosure generally pertains to the field of computer-implemented deep learning architectures.

TECHNICAL BACKGROUND

The field of static program analysis aims at analyzing program code by automated tools without executing the program code. Static program analysis can be viewed as an automated code review process.

Writing efficient code is one of the main problems in software development that requires a good understanding of the given programming language, as well as experience. For example, having instant feedback about the approximate computational complexity of an implementation would be a valuable tool for software developers.

Therefore, it is generally desirable to provide better techniques which analyze program code.

SUMMARY

According to a first aspect the disclosure provides a system comprising a latency predictor which is configured to translate the output of a transformer-encoder into a latency prediction for a code segment of a source code.

According to a further aspect the disclosure provides a computer-implemented method comprising translating the output of a transformer-encoder into a latency prediction for a code segment of a source code.

Further aspects are set forth in the dependent claims, the following description and the drawings.

BRIEF DESCRIPTION OF THE DRAWINGS

Embodiments are explained by way of example with respect to the accompanying drawings, in which:

FIG. 6 schematically describes an embodiment of a method for training a code-based runtime estimation using a transformer-encoder as described in the embodiments;

DETAILED DESCRIPTION OF EMBODIMENTS

Figure 1:
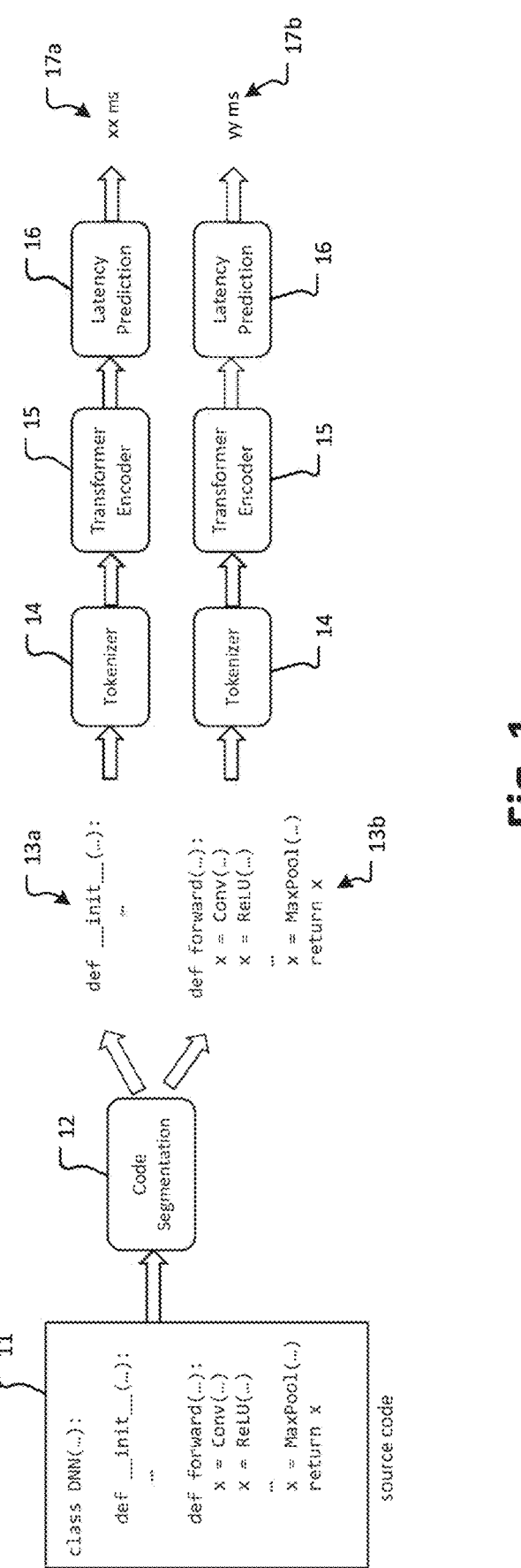
FIG. 1 schematically shows an example of a system for code-based runtime estimation using a transformer-encoder.

Before a detailed description of the embodiments under reference of FIG. 1, general explanations are made.

The embodiments described below in more detail disclose a system comprising a latency predictor which is configured to translate the output of a transformer-encoder into a latency prediction for a code segment of a source code.

The latency predictor may be for example be implemented as a software procedure for latency predictor, or as circuitry configured to perform latency prediction. Likewise, the transformer-encoder may be for example be implemented as a software procedure or as circuitry configured to act as transformer-encoder.

The system may for example be implemented as a software tool. The software tool can for example be part of an integrated development environment (IDE).

The system may for example use methods from natural language processing to estimate the runtime of written source code.

The system does not rely on compilation or interpretation of the code.

The system may further comprise a code segmentation which is configured to split the source code into the code segments. The code segmentation may be for example be implemented as a software procedure for segmenting code, or as circuitry configured to perform segmenting of code.

The code segmentation may for example be done language-dependent and rule-based, or based on a trained system. For example, the code segmentation may be performed by a parser. The code segments generated by code segmentation may for example be smaller and self-contained parts of the source code. Code segmentation may for example be configured so that these smaller junks are meaningful and self-contained segments of the source code.

The system may further comprise a tokenizer which is configured to tokenize a code segment. The tokenizer may be for example be implemented as a software procedure for tokenization, or as circuitry configured to perform tokenization.

The tokenizer may be configured to convert a code segment into a sequence of vectors that represent short sequences of characters.

The system may further comprise a transformer-encoder which operates on the output of the tokenizer.

In a training stage, the transformer-encoder may learn to capture the syntax, as well as all the algorithmic dependencies and the data dependencies within the given code segments. In this way, the transformer-encoder may be configured to act as a language model for a programming language based on which source code is written.

The latency predictions generated by the latency predictor may for example provide an online runtime prediction for the respective code segments generated by the code segmentation.

The latency predictor may for example be configured to predict the latency of a DNN from its source code representation.

The system may further comprise a code parser which is configured to extract a set of API calls from a source code representation of a DNN. The code parser may be for example be implemented as a software procedure for parsing code, or as circuitry configured to perform parsing of code.

The code parser may further be configured to extract a call sequence of the set of API calls from the source code representation of the DNN.

The call sequence may for example be represented by an adjacency matrix.

The latency predictor may comprise a GCN which is configured to aggregate the code segments and to estimate the latency of a DNN based on the code segments. The GCN may be for example be implemented as a software procedure or as circuitry configured to act as GCN.

The GCN may use both a call sequence determined by parser, and a feature matrix to compute an estimate of the latency of a DNN.

Circuitry may include a processor, a memory (RAM, ROM or the like), or a Graphics Processing Unit (GPU) for GPU-accelerated deep learning. Circuitry may further comprise a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.). Circuitry may also comprise electronic components for performing the indicated functionality.

The embodiments also disclose a computer-implemented method comprising translating the output of a transformer-encoder into a latency prediction for a code segment of a source code (11, 21).

The computer-implemented method may comprise instructions, which, when executed on a processor, perform the processing steps described in the embodiments.

The embodiments also disclose a machine-readable recording medium comprising instructions, which, when executed on a processor, perform the processing steps described in the embodiments.

Code-Based Runtime Estimation

The embodiments disclose a system and a corresponding computer-implemented method for code-based runtime estimation that uses methods from natural language processing to estimate the runtime of written source code. In particular, the method does not rely on compilation or interpretation of the code. The benefits are, that the method can also produce runtime estimates even if the code is still under development and hence cannot be compiled or executed.

The system may for example be implemented as a software tool. The software tool can for example be part of an integrated development environment (IDE).

FIG. 1 schematically shows an example of a system for code-based runtime estimation using a transformer-encoder. Source code 11 is passed to a code segmentation 12. The code segmentation 12 applies a code segmentation process to the source code 11 to split the source code 11 into smaller and self-contained junks 13a, 13b. Code segmentation 12 may for example be configured so that these smaller and self-contained junks 13a, 13b are meaningful and self-contained segments of the source code 11. Code segmentation 12 may be done language dependent and rule based, or a trained system as proposed for natural language in Ref. [1] (Lo, Kelvin, et al., 2021) may be used. Each code segment 13a, 13b is then tokenized by a tokenizer 14. Tokenizer 14 is configured to convert code segments 13a, 13b into a respective sequence of vectors that represent short sequences of characters. The result of the tokenization performed by tokenizer 14 is then fed to a transformer-encoder 15. Transformer-encoder 15 is configured to act as a language model for the programming language based on which source code 11 is written. Transformer-encoder 15 may for example be configured as described in Ref. [2] (Vaswani, Ashish, et al., 2017). More specifically, the transformer-encoder could be trained for masked language modelling, similar to Ref. [3] (Devlin, Jacob, et al., 2018). This way, the transformer-encoder learns to capture the syntax, as well as all the algorithmic dependencies and the data dependencies within the given code segments. For each code segment 13a, 13b, the output of transformer-encoder 15 is then passed to latency prediction 16. Latency prediction 16 is configured to translate the output of the transformer-encoder into a respective latency prediction 17a, 17b. The latency predictions 17a, 17b may provide online runtime prediction for the respective code segments.

The system as shown in FIG. 1 can be trained easily based on a corpus of segmented source-code with runtime annotation.

A benefit of this system is, that it actually does not rely on code compilation or execution. The machine learning model is trained to predict how the code most likely behaves. Because it is a probabilistic approach, the system should be robust with respect to minor variations in the input sequences and therefore should also be able to come up with runtime estimates, even if the syntax of the code is not 100% accurate, or if the code is not complete.

DNN Latency Prediction

The embodiment described below in more detail provide a system for code-based runtime estimation that is configured to predict the latency of DNNs directly from their source code representation. That is, the method provided in FIG. 1 above is applied to latency prediction of Deep Neural Networks, using their definition from source-code. This is important not only for manual DNN design, but also for problems like neural architecture search (NAS).

With the recent developments of Deep Learning, accurate, device specific latency prediction for Deep Neural Networks (DNNs) has become important and is urgently needed for both the manual and automatic design of efficient DNNs. Predicting the latency of DNNs directly from their source code potentially yields significant practical benefits, since it opens a way towards profilers that can instantly feedback the latency of a given piece of deep learning code to the developer.

In the embodiments described below in more detail, a system and computer-implemented method for code-based latency prediction of DNNs is provided. The embodiments leverage a language model to learn representations of short code snippets. These representations are then aggregated by a Graph Convolutional Network (GCN) that captures the algorithmic dependencies and to estimate the latency of the full implemented DNN.

The system leverages a generative pre-trained transformer encoder that is trained to encode short code segments defining single network layers. These extracted layer representations are then aggregated by a Graph Convolutional Network (GCN) that captures the data dependencies between network layers and that estimates the latency of the full DNN. There are two advantages of this approach: First, it is easy to use, because it does not require an explicit graph representation of the DNN. It can rather directly consume the human readable code representation of a DNN that is always available. Therefore, there is no additional effort involved in latency prediction. Second, it is easily extendable to support new layer types, because the layer representations are learned and directly extracted from source code, rather than handcrafted.

Figure 2:
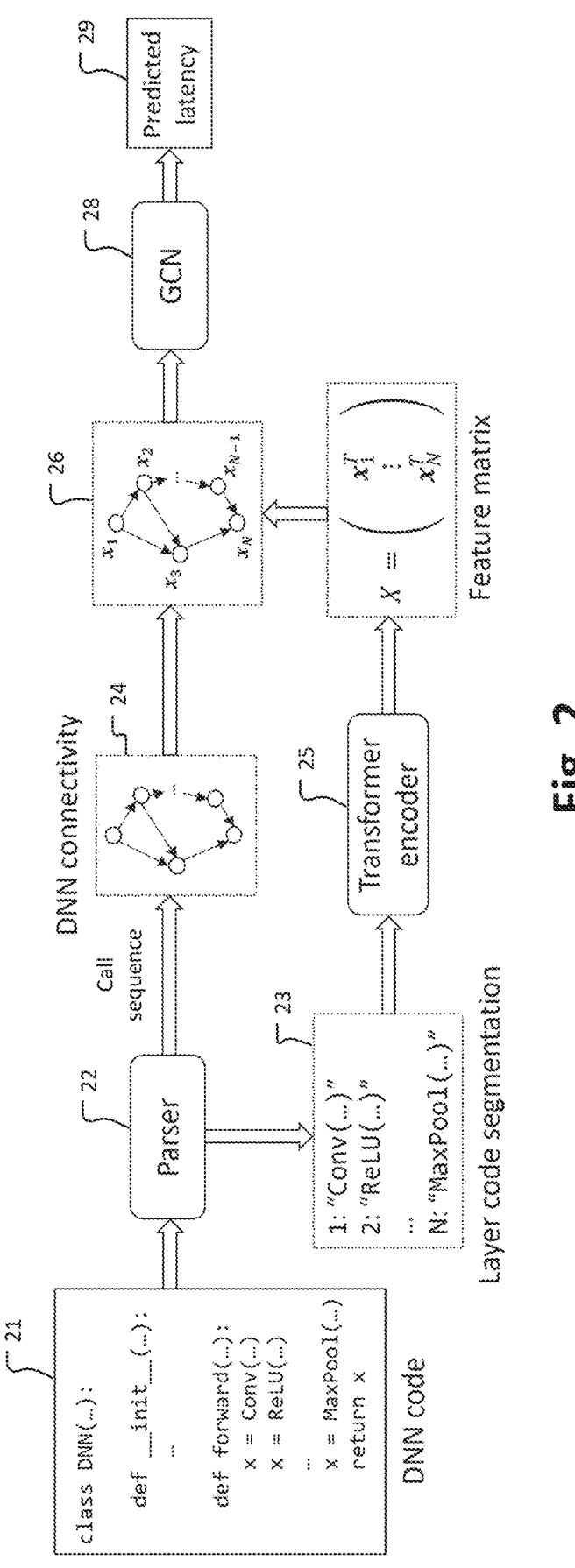
FIG. 2 schematically describes a system for code-based runtime estimation that estimates the latency of a DNN from its source code representation.

FIG. 2 schematically describes a system for code-based runtime estimation that estimates the latency of a DNN from its source code representation. DNN code 21, which is a code representation of a DNN, is provided to a code parser 22. DNN code 21 may for example comprise a sequence of commands and arguments. Code parser 22 is configured to perform code segmentation on DNN code 21. The code parser may for example be configured to extract a set of single API calls, as well as their call sequence. A transformer encoder 25 is configured to extract API call representations 23 from the source code. Transformer encoder 25 is configured to consume the API calls one at a time and to embed them into feature vectors $x_1, \ldots x_N$ which are stored in a feature matrix X. A graph convolutional neural network (GCN) 28 is configured to aggregate the API call representations 23 and estimates the latency of the DNN. GCN 28 uses both the call sequence determined by parser 22, and feature matrix X containing the API call embeddings to compute an estimate 29 of the latency of the DNN defined by DNN code 21.

The transformer encoder 25 and GCN 28 may for example be trained to predict the latency of the defined DNN for a specific target device.

Compared to natural language, where information is not very distributed and seldomly spans across many sentences, the behaviour of code and its basic properties can often span hundreds or even thousands of lines of code. This is also true for most DNN implementations. However, transformer encoders cannot be easily be scaled up to process such long sequences in one go, because the computational complexity of the attention mechanism grows quadratic with the sequence length. Therefore, the embodiment described in FIG. 2 uses a hybrid model, where the transformer encoder extracts "local" information from single API calls and the GCN captures the "global" structure.

Figure 3:
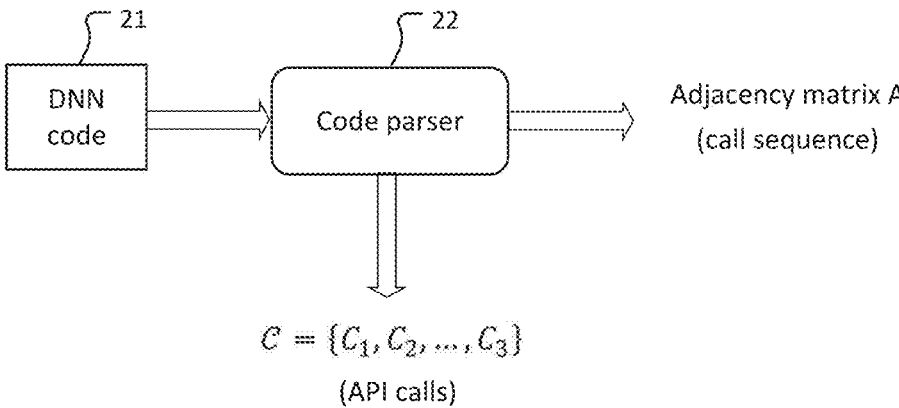
FIG. 3 shows an embodiment of code parser 22 of FIG. 2.

FIG. 3 shows an embodiment of code parser 22 of FIG. 2. Code parser 22 may for example be rule based. It identifies and extracts all API calls to the given Deep Learning framework, while unrolling loops and discarding all other code. The parser provides two outputs, a set of API calls $\mathcal{C} = \{C_1, C_2, \ldots, C_3\}$ and an adjacency matrix A. In this embodiment, each element $C_n$ set of API calls $C = \{C_1, C_2, \ldots, C_3\}$ may for example be a normalized string that contains one single call. Normalized means, that all parameters are passed always by name and exactly in the same order. Further, all white spaces are removed. This normalization is performed to simplify the problem. The adjacency matrix A output by code parser 22 encodes the call sequence of API calls $C_n$. More specifically, for a DNN that is defined by N API calls, A is an N×N upper triangular matrix.

Training

An exemplifying training process for the system according to the example provided in FIG. 2 is described here. The exemplifying training process comprises a pre-training of the transformer encoder, using a dataset of single API calls and measured latencies. Random input masking and token reconstruction plus latency prediction may be used. According to the example described below in more detail, for pre-training, two multilayer perceptrons (MLPs) are attached to the transformer encoder, such that the loss can be computed and the parameters can be optimized. After pre-training, the GCN (28 in FIG. 2) is trained on a DNN dataset consisting of DNN/latency pairs.

Figure 4:
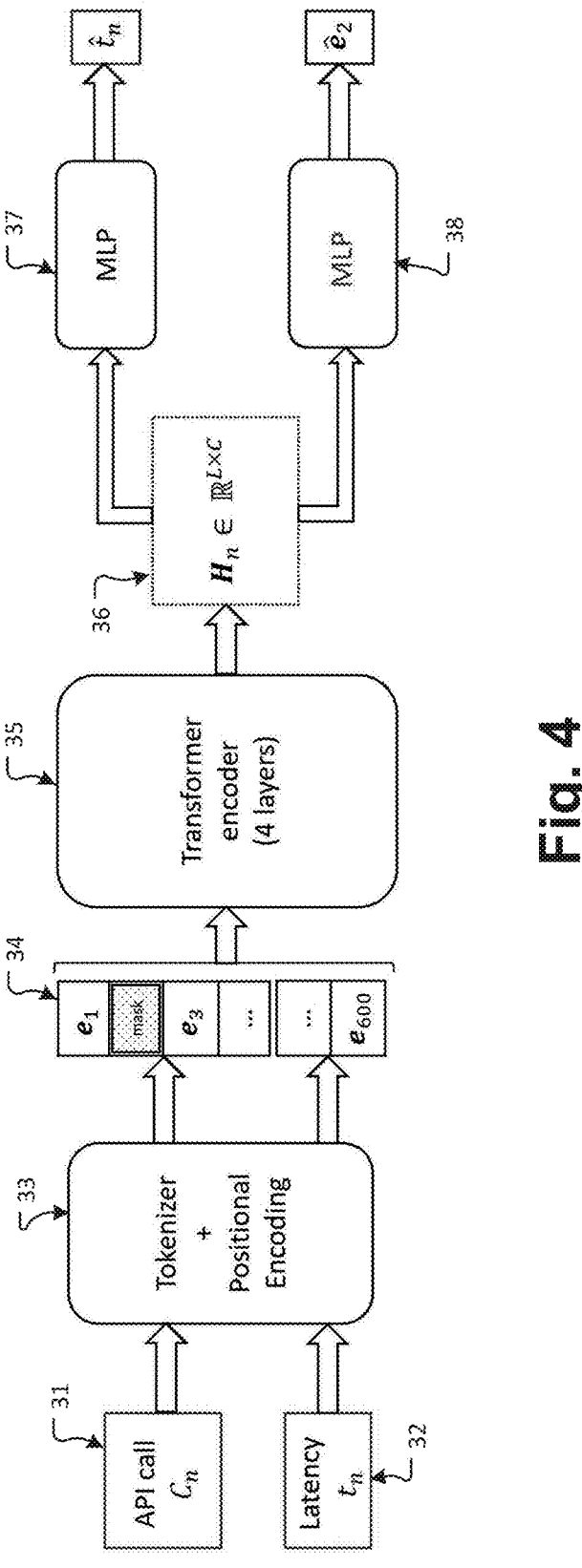
FIG. 4 shows an example of a training phase of a code-based runtime estimation with transformer encoder 35, tokenizer 33 and latency prediction head 37.

FIG. 4 shows an example of a training phase of a code-based runtime estimation with transformer encoder 35, tokenizer 33 and latency prediction head 37. The system processes each API call $C_n$ individually. First, API call $C_n$ is tokenized by tokenizer 33 into a set of tokens $e_1, e_2, \ldots, e_L$. Tokenizer 33 may for example use the uncased english BERT tokenizer from the PyTorch transformer implementation that uses a dictionary of D=xx tokens, where xx is the number of tokens comprises by the dictionary. It should be noted that tokenizer 33 is not necessarily tailored to source code. That is, a standard tokenizer can be used that represents single characters or short sequences of characters as a vector. But performance of the whole system can be improved if a tokenizer is used that is specifically tailored to source code.

The transformer encoder 35 may have an architecture similar to BERT (Ref [4]: Devlin et al., 2019) and may also uses the same positional encoding. For example, it may consist of 4 multi-head attention blocks with 16 attention heads each. Both the hidden and embedding dimension of the attention blocks may for example be choses as C=512. The layer normalization is performed before attention is applied. The maximum sequence length of this exemplary embodiment is chosen a L=600 tokens, without limiting the embodiments to this exemplifying value. Consequently, the output of the transformer for the input $C_n$ is $H_n \in \mathbb{R}^{L \times C}$.

The transformer encoder may be pre-trained with two objectives at the same time, using random input masking: 1) Input token reconstruction. 2) Latency prediction. Therefore $H_n$ is processed in parallel with a token decoder, MLP 38 and a latency prediction head, MLP 37. The token decoder head, MLP 38, is a single linear layer of size C×D that is applied to and makes a prediction $\hat{e}_1, \hat{e}_2, \ldots, \hat{e}_L$. for each token embedding $h_n$, separately. MLP 38 for sequence prediction thus takes each input embedding as an input, separately, and has a vector valued output. The input of the latency prediction head 37 is the average of the token embeddings $h_n = H_n^T 1/L$. MLP 37 for latency prediction uses this mean of the token embeddings as input and produces one scalar output. MLP 37 may for example be a multilayer perceptron (MLP) with one hidden layer of size 256 and an output layer of size 1 that estimates the log latency $\hat{t}_n$, of the API call. Consequently, the transformer encoder is trained with two losses, i.e., the categorical cross-entropy loss for token reconstruction and the mean squared error (MSE) for the log latency estimation. MLP 37 is trained to predict latencies of individual API calls. It is only used to pre-train the transformer, i.e., it assures that the extracted token embeddings capture latency information. However, MLP 37 is discarded after training of the transformer. After training, only the extracted embeddings are fed to the GCN (28 in FIG. 2), which predicts the latency of multiple API calls.

By combining these two losses for pre-training, it is made sure that the transformer encoder learns to extract token representations that capture the syntax of the API calls while also carrying information about their expected latency. Besides examples of single API calls, the pre-training of the transformer encoder also relies on latency measurements for individual calls.

The two MLPs 37, 38 shown in FIG. 4 are only needed for training of the transformer. They are discarded during inference (see FIGS. 1 and 2).

A training dataset can be collected by choosing random input argument configurations, while executing and measuring the latency of each on the given target device.

After training (interference stage), the GCN uses the embeddings of single API calls that are computed by the transformer-encoder as an input. In the interference stage, the MLPs are no longer needed. Instead, the intermediate output $$h_n = \frac{H_n^T 1}{L}$$

(i.e. the token embeddings) is taken, which summarizes all important properties of the single API calls.

GCN

GCN 28 of FIG. 2 combines the output of the transformer encoder for all $C_n \in \mathcal{C}$ and calculates a latency estimate for the full DNN. In general, a GCN can process graph signals. Let $\mathcal{G} = (V,E)$ be a graph, where V is a set of N vertices and E is a set of edges connecting them. A graph signal means to assign a vector to each vertice, i.e., $h_i = h(v_i) \in \mathbb{R}^C$ which can be seen as a feature vector that describes the intrinsic properties of the vertice $v_i$. GCNs exploit the properties of dependence between all $v_i$ in order to make predictions on the vertice or on the graph level, while taking the graph structure into account.

The sequence $\mathcal{C}$ of API calls that defines the DNN can be represented as a graph. Here, the vertices correspond to the single API calls $C_n$ and their properties are summarized by the average token embedding computed by the transformer encoder. The edges between vertices correspond to data dependencies between API calls. More specifically, an edge between vertice $v_i$ and $v_j$ means that the call j takes the return value of call i as a parameter. Therefore, the execution of v must be completed before $v_j$ can be executed.

To process the graph with a GCN, the average embeddings for all API calls are summarized in the feature matrix $H^0 = [h_1, h_2, \ldots, h_N] \in \mathbb{R}^{N \times C}$. Then the layer-wise propagation rule of a L-layer GCN is defined as follows:

$$H^l = f(H^{l-1}, A) = \sigma(A H^{l-1} W^l),$$

where $l=1, 2, \ldots, L$, $H^l \in \mathbb{R}^{N \times M_l}$ and $W^l \in \mathbb{R}^{M_{l-1} \times M_l}$ are the layer index, the layer activation and weight the weight matrix. Further, $M_l$ are the hidden feature dimensions and $A \in \mathbb{R}^{N \times N}$ is the adjacency matrix of the graph. It is a binary upper triangular matrix with $A_{i,j}=1$ if there is a data dependency between $v_i h$ and $v_j$ and $A_{i,j}=0$ otherwise. $\sigma$ is the ReLU activation function.

The latency estimates are computed from $H^l \in \mathbb{R}^{N \times M_l}$— the activation of the last GCN layer—that contains the vertice-level representations extracted by the GCN. More specifically, first a global average pooling is performed over the vertice dimension $H_L^T 1/N$ in order to get a vector that encodes the properties of the whole graph and then apply a linear output layer of dimension $M_l \times 1$.

In experiments, the GCN is trained in a supervised setup using the mean absolute percentage error (MAPE) as a loss. Moreover, it is trained independently of the transformer encoder, meaning that the parameters of the encoder are kept fixed after pre-training and are not optimized together with the GCN parameters.

Flow Diagrams

Figure 5:
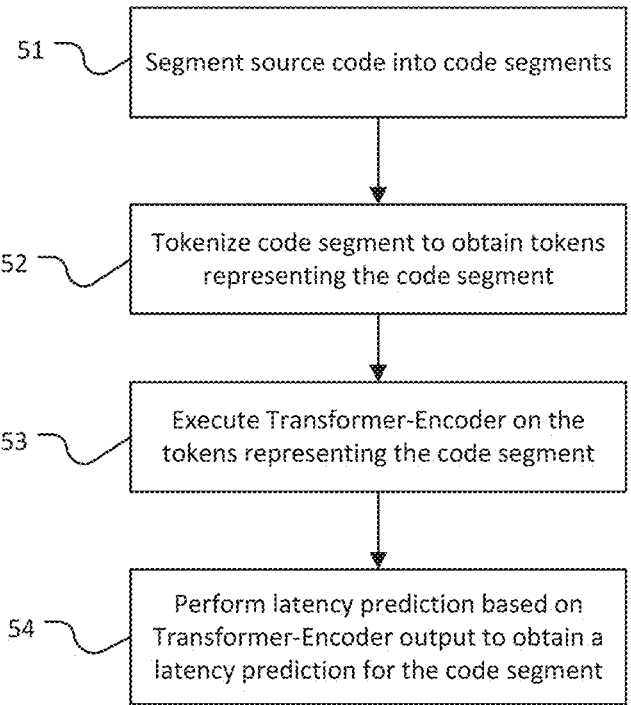
FIG. 5 schematically describes an embodiment of a method for code-based runtime estimation using a transformer-encoder.

FIG. 5 schematically describes an embodiment of a method for code-based runtime estimation using a transformer-encoder as described in the embodiments. The method corresponds to the functionality performed by the system of FIG. 1. At 51*m* a source code is segmented into code segments. At 52, a code segment of the source code is tokenized in order to obtain tokens representing the code segment. At 53, a Transformer-Encoder is executed on the tokens representing the code segment. At 54, a latency prediction is performed based on the Transformer-Encoder output to obtain a latency prediction for the code segment. Steps 52 to 54 may be performed for each code segment of the source code to obtain a latency prediction for each code segment.

FIG. 6 schematically describes an embodiment of a method for training a code-based runtime estimation using a transformer-encoder as described in the embodiments. At 61, source code is segmented into code segments. At 62, the code segments are tokenized to obtain tokens representing the code segments. At 63, a Transformer-Encoder is executed on the tokens representing the code segment to generate token embeddings. At 64, latency prediction is performed based on average of the token embeddings to obtain a latency prediction for each code segment. At 65, a token prediction is determined for each token embedding. At 66, a loss is computed and the DNN parameters are optimized based on the latency predictions and token predictions. After this pre-training, a GCN may be trained on a DNN dataset consisting of DNN/latency pairs (not shown in FIG. 6).

EXPERIMENTS

Experiments have been performed with automatically and randomly generated DNN architectures. The experiments show that the code-based runtime estimation of the embodiments can in fact predict the latency from code, while being competitive with traditional latency prediction methods for DNNs.

In the experiments automatically generated DNNs were used, what allowed to build a large and heavily normalized dataset to train the code-based runtime estimation of the embodiments.

In the experiments, two automatically generated datasets have been collected, one to pre-train the transformer and one to train the full model. In particular, DNN code representations have been synthesized in Python, using Neural Network Libraries (NNabla) (Ref. [5]: Hayakawa et al., 2021) as a deep learning framework.

The first dataset $\mathcal{D}_{transf} = \{(C_1, t_1), (C_2, t_2), \ldots, (C_M, t_M)\}$ consists of randomly generated API calls $C_i$ and their measured latency $t_i$. Here, the API calls "Add", "Convolution", "Linear", "ReLU", "BatchNormalization", "AveragePooling", "MaxPooling" and "GlobalAveragePooling" of NNabla are considered, where the input arguments are chosen randomly. For "Convolution", for example random input tensor and kernel shapes are chosen, as well as random output channel count and stride. The latency for each random parameter configuration is measured on the GPU.

The second dataset $\mathcal{D}_{COBRA} = \{(A_1, H_1, t_1), (A_2, H_2, t_2), \ldots, (A_K, H_K, t_K)\}$ is used to train the GCN and is constructed from randomly generated DNNs, from which the adjacency matrices $A_k$ and the vertice features $H_k$ have already been extracted using the code parser and the pre-trained transformer encoder. For each DNN the latency on the GPU measured. In total, a dataset of K=2000 random ResNet-like models (Ref. [6]: He et al., 2016) is collected. ResNet-like means that not only skip-connections are allowed between neighbouring, but also between any two arbitrary network layers. The number of network layers is random, but is never larger than 20. Also the individual layer types and their parameters, e.g. like the number of output channels and the stride of a convolution, are chosen randomly.

For the experiment, the transformer encoder has been pre-trained using 35 epochs. The GCN is later trained, using 1500 epochs. Table 1 shows how accurate the transformer encoder can predict the latency of single API calls after pre-training.

TABLE 1

The performances of the code-based runtime estimation of the embodiments, compared to other latency predictors for DNNs.

| method | MAPE (ms) | RMSE (ms) | error bound (%) | | | |
| | | | ±1% | ±5% | ±10% | ±25% |
|---|---|---|---|---|---|---|
| Layer-wise sum | 0.0807 | 3.54 | 15.2 | 51.8 | 78.0 | 95.0 |
| BRP-NAS | 0.0358 ± 7e−3 | 13.3 ± 3.4 | 26.1 ± 5.8 | 81.9 ± 7.6 | 93.4 ± 3.1 | 99.6 ± 0.3 |
| BRP-NAS++[a] | 0.0225 ± 3e−3 | 6.50 ± 1.3 | 37.2 ± 5.3 | 92.7 ± 3.3 | 98.3 ± 0.4 | 99.5 ± 0.1 |
| COBRA (Ours) | 0.0165 ± 1e−3 | 6.89 ± 1.9 | 45.3 ± 2.7 | 96.2 ± 1.6 | 99.0 ± 0.4 | 99.8 ± 0.2 |

Table 1 shows how accurate the code-based runtime estimation of the embodiments can predict the latency of full DNNs, directly from their source code representation. The result is compared to two other latency prediction methods for DNNs, namely the layerwise sum and BRP-NAS. MAPE indicates the Mean absolute percentual error in milliseconds (ms).

The experiments demonstrate the feasibility of latency prediction directly from source code. In particular, the model of the embodiments described above achieved competitive results compared to other latency prediction methods for DNN.

Figure 7:
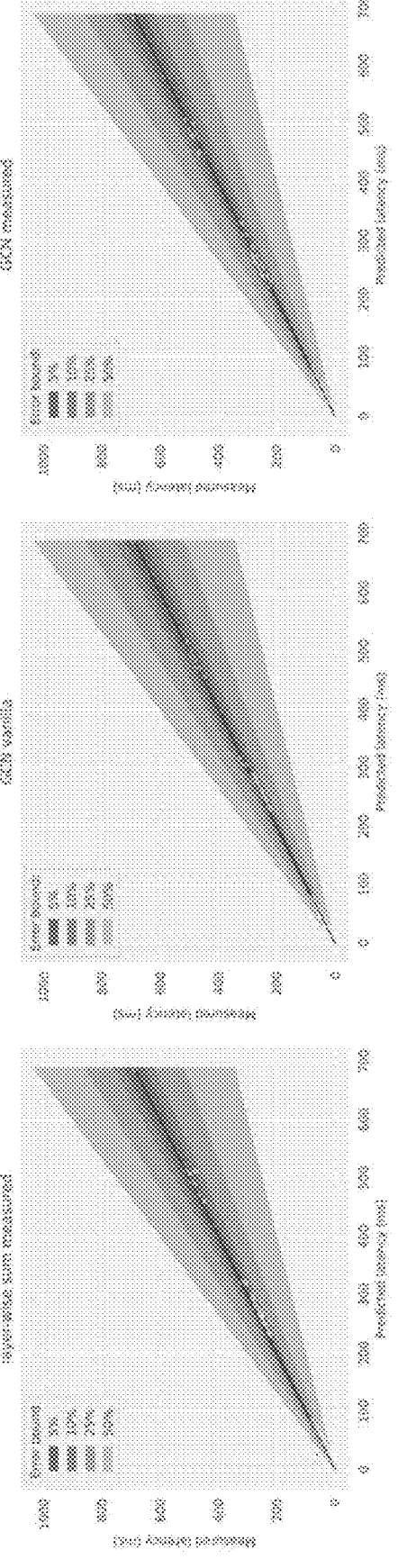
FIG. 7 shows a comparison between latency predicted by the system for code-based runtime estimation using a transformer-encoder of the embodiments, and the latency measured in an experiment.

FIG. 7 shows a comparison between latency predicted by the system for code-based runtime estimation using a transformer-encoder of the embodiments, and the latency measured in an experiment. The left diagram shows the predicted latency in milliseconds (ms) versus the measured latency in milliseconds (ms) for a layer-wise sum measurement. The diagram in the middle shows the predicted latency in milliseconds (ms) versus the measured latency in milliseconds (ms) for GCN vanilla, and the right diagram shows the predicted latency in milliseconds (ms) versus the measured latency in milliseconds (ms) for a GCN measured.

Transformer Encoder Configuration Example

In the following, an example of a transformer encoder configuration is provided.

The tokenizer and the positional encoding used in this embodiment are the same as in BERT (Ref. [4]: Devlin et al., 2019), but the architecture is a lighter version of BERT-BASE, in particular with less layers and a smaller hidden size. All the hyperparameters of the transformer are summarized in Table 2.

TABLE 2

Training hyperparameters of the transformer encoder

| | |
|---|---|
| Number of layers | 4 |
| Hidden size | 512 |
| FFN inner hidden size | 512 |
| Attention heads | 16 |
| Max. sequence length | 600 |
| Batch size | 64 |
| Max epochs | 200 |

TABLE 2-continued

Training hyperparameters of the transformer encoder

| | |
|---|---|
| Learning rate | 0.001 |
| Learning rate scheduler | Step decay |
| Learning rate decay factor | 0.9 (per epoch) |
| Gradient clipping | 0.5 |
| Dropout probabillity | 0.5 |
| Masking probabillity | 0.1 |

TABLE 2-continued

Training hyperparameters of the transformer encoder

| | |
|---|---|
| Adam $\epsilon$ | 1e−08 |
| Adam $\beta_1$ | 0.9 |
| Adam $\beta_2$ | 0.999 |
| L2 weight decay | 0.0 |

The transformer learns the non-linearity dependencies between a specific layer configuration and its corresponding latency. Therefore a layers dataset is generated composed of code snippets, where each snippet is the code implementation required to execute a layer with a specific configuration. To keep it simple, random sampling is used to select the layer configurations, i.e., for each sample a uniformly random layer configuration is picked on a specific range of values.

The layers dataset is therefore very general, with various possible configurations and allowing even to have configuration with non-equal input width and height.

TABLE 3

The different types of layers and configurations of the layers dataset used to train the transformer.

| Type | # samples | Configuration space |
|---|---|---|
| Conv. | 115,192 | H, W, $C_{in}$, $C_{out}$ $\epsilon$ range(1, 1000) |
| | | $K_1$, $K_2$, $S_1$, $S_2$ $\epsilon$ range(1, 10) |
| | | $P_1$, $P_2$ $\epsilon$ range(0, 10) |
| | | $D_1$, $D_2$ $\epsilon$ range (1, 5) |
| | | G = gcd($C_{in}$, $C_{out}$) |
| BatchNorm. | 38,020 | H, W, C, $\epsilon$ range(1, 1000) |
| ReLU | 64,734 | H, W, C, $\epsilon$ range(1, 1000) |
| Add | 10,000 | H, W, C, $\epsilon$ range(1, 1000) |
| | | M $\epsilon$ range(2, 10) |
| FullyCon. | 20,164 | $C_{in}$, $C_{out}$ $\epsilon$ range(1, 1000) |
| Avgpool | 3,806 | H, W, $C_{in}$, $C_{out}$ $\epsilon$ range(1, 1000) |
| | | $K_1$, $K_2$, $S_1$, $S_2$ $\epsilon$ range(1, 10) |
| | | $P_1$, $P_2$ $\epsilon$ range(0, 10) |

TABLE 3-continued

| The different types of layers and configurations of the layers dataset used to train the transformer. | | |
|---|---|---|
| Type | # samples | Configuration space |
| Maxpool | 2,108 | H, W, $C_{in}$, $C_{out}$ $\epsilon$ range(1, 1000) $K_1$, $K_2$, $S_1$, $S_2$ $\epsilon$ range (1, 10) $P_1$, $P_2$ $\epsilon$ range(0, 10) |
| GlobalAvgPool | 13,934 | H, W, C $\epsilon$ range(1,1000) |

H is the height,
W the width,
C the number of channels,
K the kernel size,
S the stride,
P the padding,
D the dilation,
G the number of groups and
M the number of tensors as input.

Table 3 describes the different layer configurations as well as the number of samples for each type of layer. For each layer configuration, its latency is measured.

Using the layers dataset, the transformer encoder is trained to produce an embedding of the layer code snippet.

GCN Configuration Example

In the following, an example of a GCN configuration is provided.

Training properly the different GCNs highly depends on the values of the hyperparameters. Therefore an hyperparameter optimization framework called Optuna (Ref. [7]: Akiba et al., 2019) is used to find good hyperparameters for each GCN. The list of all the hyperparameters is available in Table 4.

TABLE 4

| Training hyperparameters of the different GCNs predictors obtained by the hyperparameter optimization framework. | | | |
|---|---|---|---|
| | BRP-NAS | BRP-NAS + extra | COBRA |
| Number of layers | 4 | 4 | 4 |
| Hidden size | 0.000 | 0.000 | 0.000 |
| Batch size | 0.000 | 0.000 | 0.000 |
| Max epochs | 0.000 | 0.000 | 0.000 |
| Initial learning rate | 0.001 | 0.001 | 0.001 |
| Adam $\epsilon$ | 1e−08 | 1e−08 | 1e−08 |
| Adam $\beta_1$ | 0.9 | 0.9 | 0.9 |
| Adam $\beta_2$ | 0.999 | 0.999 | 0.999 |
| L2 weight decay | 0.000 | 0.000 | 0.000 |
| Dropout ratio | 0.000 | 0.000 | 0.000 |

IMPLEMENTATION

Figure 8:
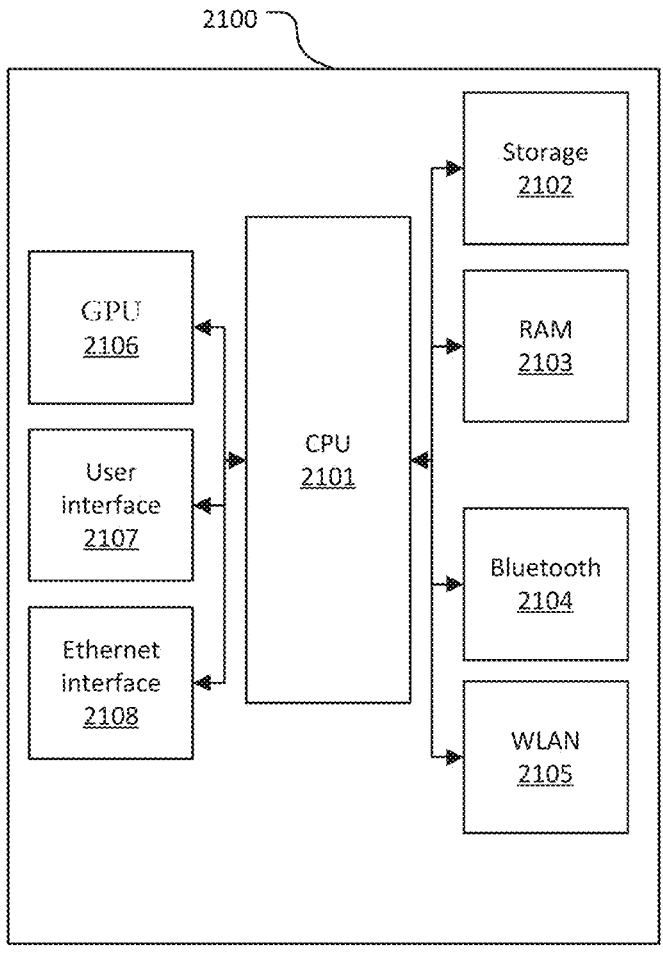
FIG. 8 schematically describes an embodiment of a device that implements the system for code-based runtime estimation using a transformer-encoder as described in the embodiments.

FIG. 8 schematically describes an embodiment of a device that implements the system for code-based runtime estimation using a transformer-encoder as described in the embodiments above. The electronic device 2100 may implement all processes related to the embodiments. The electronic device 2100 comprises a CPU 2101 as processor. The electronic device 2100 further comprises a GPU 2106 connected to the processor 2101. The processor 2101 may implement any processes related to code-based runtime estimation as described above. GPU 2106 may be used to assist the CPU 2101 to implement processes that are realized by neural network models, such as for example GCN 28 of FIG. 2, or MLP 37 of FIG. 2. The electronic device 2100 further comprises a user interface 2107 that is connected to the processor 2101. This user interface 2107 acts as a man-machine interface and enables a dialogue between an administrator and the electronic system. For example, an administrator may make configurations to the system using this user interface 2107. The electronic device 2100 further comprises a Bluetooth interface 2104, a WLAN interface 2105, and an Ethernet interface 2108. These units 2104, 2105 act as I/O interfaces for data communication with external devices. For example, other devices with Ethernet, WLAN or Bluetooth connection may be coupled to the processor 2101 via these interfaces 2104, 2105, and 2108. The electronic device 2100 further comprises a data storage 2102, and a data memory 2103 (here a RAM). The data storage 2102 is arranged as a long-term storage, e.g. for storing parameters for one or more use-cases, or the like. The data memory 2103 is arranged to temporarily store or cache data or computer instructions for processing by the processor 2101.

It should be noted that the description above is only an example configuration. Alternative configurations may be implemented with additional or other units, sensors, or the like.

It should also be noted that the division of the systems of FIGS. 1, 2 and 4, and of the device of FIG. 8 into units is only made for illustration purposes and that the present disclosure is not limited to any specific division of functions in specific units.

It should also be recognized that the embodiments describe methods with an exemplary ordering of method steps. The specific ordering of method steps is, however, given for illustrative purposes only and should not be construed as binding.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

[1] A system comprising a latency predictor (16, 28) which is configured to translate the output of a transformer-encoder (15, 25) into a latency prediction (17a, 17b) for a code segment (13a, 13b; 23) of a source code (11, 21).

[2] The system of [1], comprising a code segmentation (12, 22) which is configured to split the source code (11, 21) into the code segments (13a, 13b).

[3] The system of [1] or [2], further comprising a tokenizer (14, 33) which is configured to tokenize a code segment (13a, 13b).

[4] The system of any one of [1] to [3], wherein the tokenizer (14) is configured to convert a code segment (13a, 13b) into a sequence of vectors that represent short sequences of characters.

[5] The system of [3], further comprising a transformer-encoder (15, 25) which operates on the output of the tokenizer (14).

[6] The system of any one of [1] to [5], wherein the latency predictor (28) is configured to predict the latency of a DNN from its source code representation (21).

[7] The system of any one of [1] to [6], comprising a code parser (22) which is configured to extract a set of API calls ($C = \{C_1, C_2, \ldots, C_3\}$) from a source code representation (21) of a DNN.

[8] The system of [7], wherein the code parser (22) is further configured to extract a call sequence (A) of the set of API calls ($C = \{C_1, C_2, \ldots, C_3\}$) from the source code representation (21) of the DNN.

[9] The system of [8], wherein the call sequence is represented by an adjacency matrix (A).

[10] The system of any one of [1] to [9], wherein the latency predictor (16, 28) comprises a GCN (28) which is configured to aggregate the code segments (23) and to estimate the latency of a DNN based on the code segments (23).

[11] The system of [10], wherein the GCN (28) uses both a call sequence determined by parser (22), and a feature matrix ($X, H_0$) to compute an estimate (29) of the latency of a DNN.

[12] A computer-implemented method comprising translating (16, 28) the output of a transformer-encoder (15, 25) into a latency prediction (17a, 17b) for a code segment (13a, 13b; 23) of a source code (11, 21).

[13] The computer-implemented method of [12], comprising splitting the source code (11, 21) into the code segments (13a, 13b).

[14] The computer-implemented of [12] or [13], further comprising tokenizing a code segment (13a, 13b).

[15] The computer-implemented of [14], wherein the step of tokenizing comprises converting a code segment (13a, 13b) into a sequence of vectors that represent short sequences of characters.

[16] The computer-implemented of any one of [12] to [15], further comprising a transformer-encoding (15, 25) which operates on the output of the tokenization (14).

[17] The computer-implemented of any one of [12] to [16], wherein the latency prediction (28) is configured to predict the latency of a DNN from its source code representation (21).

[18] The computer-implemented of any one of [12] to [17], comprising extracting a set of API calls ($C = \{C_1, C_2, \ldots, C_3\}$) from a source code representation (21) of a DNN.

[19] The computer-implemented of [18], further comprising extracting a call sequence (A) of the set of API calls ($C = \{C_1, C_2, \ldots, C_3\}$) from the source code representation (21) of the DNN.

[20] The computer-implemented of [19], wherein the call sequence is represented by an adjacency matrix (A).

[21] The computer-implemented of any one of [12] to [20], wherein the latency prediction (16, 28) comprises aggregating the code segments (23) and estimating the latency of a DNN based on the code segments (23).

[22] The computer-implemented of [21], wherein both a call sequence determined by parser (22), and a feature matrix ($X, H_0$) are used to compute an estimate (29) of the latency of a DNN.

REFERENCES

[1] Lo, Kelvin, et al. "Transformer over Pre-trained Transformer for Neural Text Segmentation with Enhanced Topic Coherence." arXiv preprint arXiv:2110.07160 (2021).

[2] Vaswani, Ashish, et al. "Attention is all you need." Advances in neural information processing systems. 2017.

[3] Devlin, Jacob, et al. "Bert: Pre-training of deep bidirectional transformers for language understanding." arXiv preprint arXiv:1810.04805 (2018).

[4] Jacob Devlin, Ming-Wei Chang, Kenton Lee, and Kristina Toutanova. Bert: Pre-training of deep bidirectional transformers for language understanding, 2019.

[5] Akio Hayakawa, Masato Ishii, Yoshiyuki Kobayashi, Akira Nakamura, Takuya Narihira, Yukio Obuchi, Andrew Shin, Takuya Yashima, and Kazuki Yoshiyama. Neural network libraries: A deep learning framework designed from engineers' perspectives, 2021.

[6] Kaiming He, Xiangyu Zhang, Shaoqing Ren, and Jian Sun. Deep residual learning for image recognition. In 2016 IEEE Conference on Computer Vision and Pattern Recognition (CVPR), pp. 770-778, 2016. doi: 10.1109/CVPR.2016.90.

[7] Takuya Akiba, Shotaro Sano, Toshihiko Yanase, Takeru Ohta, and Masanori Koyama. Optuna: A next-generation hyperparameter optimization framework. In Proceedings of the 25rd ACM SIGKDD International Conference on Knowledge Discovery and Data Mining, 2019.

The invention claimed is:

1. A system comprising:
   circuitry configured to:
   accept a source code of a first neural network;
   segment the source code of the first neural network into a plurality of source code segments of the first neural network, where each of the source code segments of the first neural network defines an application program interface (API) call of the first neural network;
   perform a transforming-encoding process for each of the source code segments of the first neural network to generate a feature matrix of API calls of the first neural network; and
   implement a second neural network to
      accept the feature matrix of the API calls of the first neural network and a call sequence of a set of the API calls, and
      use both the call sequence of the set of the API calls and the feature matrix to estimate a latency of the first neural network.

2. The system of claim 1, wherein the circuitry is configured to tokenize each of the source code segments of the first neural network.

3. The system of claim 2, wherein the tokenizing includes converting a code segment of the source code segments of the first neural network into a sequence of vectors that represent short sequences of characters.

4. The system of claim 2, wherein the transforming-encoding process operates on an output of the tokenizing.

5. The system of claim 1, wherein the first neural network is a deep neural network.

6. The system of claim 1, wherein the circuitry is configured to extract the call sequence of the set of the API calls from the source code of the first neural network.

7. The system of claim 6, wherein the circuitry is configured to represent the call sequence by an adjacency matrix.

8. The system of claim 1, wherein
   the first neural network is a deep neural network, and
   the second neural network is a graph convolutional network.

9. The system of claim 1, wherein the transforming-encoding process includes capturing syntax, algorithmic dependencies, and data dependencies of each of the source code segments of the first neural network.

10. The system of claim 1, wherein each of the source code segments of the first neural network defines a single network layer.

11. The system of claim 1, wherein the estimated latency includes a latency prediction of the first neural network fully implemented.

12. The system of claim 1, wherein
the first neural network is a deep neural network, and
the estimated latency includes a latency prediction of the deep neural network fully implemented.

13. The system of claim 1, wherein the second neural network is a graph neural network.

14. A computer-implemented method comprising:
accepting a source code of a first neural network;
segmenting the source code of the first neural network into a plurality of source code segments of the first neural network, where each of the source code segments of the first neural network defines an application program interface (API) call of the first neural network;
performing a transforming-encoding process for each of the source code segments of the first neural network to generate a feature matrix of the API calls of the first neural network; and
implementing a second neural network to
accept the feature matrix of the API calls of the first neural network and a call sequence of a set of the API calls, and
use both the call sequence of the set of the API calls and the feature matrix to estimate a latency of the first neural network.

16

15. The computer-implemented method of claim 14, further comprising tokenizing each of the source code segments of the first neural network.

16. The computer-implemented method of claim 15, wherein the tokenizing includes converting a code segment of the source code segments of the first neural network into a sequence of vectors that represent short sequences of characters.

17. A non-transitory computer readable medium storing instructions which when executed cause a computer to perform a method, the method comprising:
accepting a source code of a first neural network;
segmenting the source code of the first neural network into a plurality of source code segments of the first neural network, where each of the source code segments of the first neural network defines an application program interface (API) call of the first neural network;
performing a transforming-encoding process for each of the source code segments of the first neural network to generate a feature matrix of the API calls of the first neural network; and
implementing a second neural network to
accept the feature matrix of the API calls of the first neural network and a call sequence of a set of the API calls, and
use both the call sequence of the set of the API calls and the feature matrix to estimate a latency of the first neural network.

* * * * *